(12) United States Patent
Ji

(10) Patent No.: US 12,058,711 B2
(45) Date of Patent: *Aug. 6, 2024

(54) SIDELINK OPERATION METHOD AND TERMINAL

(71) Applicant: VIVO MOBILE COMMUNICATION CO., LTD., Guangdong (CN)

(72) Inventor: Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 1 day.

This patent is subject to a terminal disclaimer.

(21) Appl. No.: 17/970,492

(22) Filed: Oct. 20, 2022

(65) Prior Publication Data

US 2023/0040458 A1 Feb. 9, 2023

Related U.S. Application Data

(63) Continuation of application No. 17/068,727, filed on Oct. 12, 2020, now Pat. No. 11,510,211, which is a (Continued)

(30) Foreign Application Priority Data

Apr. 13, 2018 (CN) .......................... 201810332849.7

(51) Int. Cl.
*H04W 72/53* (2023.01)
*H04L 5/00* (2006.01)
(Continued)

(52) U.S. Cl.
CPC ........... *H04W 72/53* (2023.01); *H04L 5/0051* (2013.01); *H04W 24/10* (2013.01); *H04W 72/23* (2023.01);
(Continued)

(58) Field of Classification Search
CPC ..... H04W 72/53; H04W 24/10; H04W 72/23; H04W 76/11; H04W 76/27; H04W 80/02;
(Continued)

(56) References Cited

U.S. PATENT DOCUMENTS 11,191,020 B2 11/2021 Chen et al.
2017/0150480 A1* 5/2017 Kim .................. H04L 67/12
(Continued)

FOREIGN PATENT DOCUMENTS

CN 102215582 A 10/2011
CN 103702346 A 4/2014
(Continued)

OTHER PUBLICATIONS

Huawei et al., "Feedback information for sidelink link adaptation," 3GPP TSG RAN WG1 Meeting #90, R1-1712136, pp. 1-3, (Aug. 12, 2017).
(Continued)

*Primary Examiner* — Kiet Tang
(74) *Attorney, Agent, or Firm* — Price Heneveld, LLP

(57) ABSTRACT

The embodiments of the present disclosure provide a sidelink operation method and a terminal. The method includes: acquiring sidelink configuration information, wherein the sidelink configuration information includes at least one of feedback configuration information and measurement configuration information; performing at least one of a measurement operation and a feedback operation on sidelink according to the sidelink configuration information.

20 Claims, 3 Drawing Sheets

Related U.S. Application Data continuation of application No. PCT/CN2019/081896, filed on Apr. 9, 2019.

(51) Int. Cl.
    *H04W 24/10*     (2009.01)
    *H04W 72/23*     (2023.01)
    *H04W 76/11*     (2018.01)
    *H04W 76/27*     (2018.01)
    *H04W 80/02*     (2009.01)
    *H04W 92/18*     (2009.01)

(52) U.S. Cl.
    CPC ............ *H04W 76/11* (2018.02); *H04W 76/27* (2018.02); *H04W 80/02* (2013.01); *H04W 92/18* (2013.01)

(58) Field of Classification Search
    CPC ............. H04W 92/18; H04W 52/0212; H04W 56/0015; H04W 24/02; H04W 52/0209; H04W 4/70; H04W 72/1263; H04L 5/0051; H04L 1/1829; H04L 5/0048; H04L 1/1854; H04L 1/1607; Y02D 30/70; H04B 17/309

See application file for complete search history.

(56) References Cited

U.S. PATENT DOCUMENTS

| | | | |
|---|---|---|---|
| 2017/0251485 A1 | 8/2017 | Kalhan et al. | |
| 2017/0347394 A1 | 11/2017 | Yasukawa et al. | |
| 2018/0115930 A1* | 4/2018 | Belleschi | H04W 36/0072 |
| 2018/0368191 A1* | 12/2018 | Vutukuri | H04W 76/15 |
| 2019/0166559 A1 | 5/2019 | Chen et al. | |
| 2019/0229952 A1 | 7/2019 | Sun et al. | |
| 2020/0236666 A1* | 7/2020 | Yu | H04L 1/1812 |

FOREIGN PATENT DOCUMENTS

| | | |
|---|---|---|
| CN | 103731245 A | 4/2014 |
| CN | 104080170 A | 10/2014 |
| CN | 105790886 A | 7/2016 |
| CN | 105813204 A | 7/2016 |
| CN | 105917733 A | 8/2016 |
| CN | 106793092 A | 5/2017 |
| CN | 107666691 A | 2/2018 |
| CN | 107734543 A | 2/2018 |
| EP | 2 782 284 A2 | 9/2014 |
| EP | 3 242 515 A1 | 11/2017 |
| JP | 2017-527185 A | 9/2017 |
| JP | 2018-056813 A | 4/2018 |
| WO | 2016/076301 A1 | 5/2016 |
| WO | 2017/026977 A1 | 2/2017 |
| WO | 2017/146780 A1 | 8/2017 |
| WO | 2018/022784 A1 | 2/2018 |

OTHER PUBLICATIONS

Intel Corporation., "Sidelink Feedback Information and Signalling for Wearable and IoT Use Cases," 3GPP TSG RAN WG1 Meeting #90, R1-1712521, pp. 1-8, (Aug. 12, 2017).

CN First Office Action dated Apr. 10, 2020 as received in Application No. 201810332849.7.

International Search Report and Written Opinion of the International Searching Authority dated Oct. 22, 2020 as received in Application No. PCT/CN2019/081896.

CN Second Office Action dated Dec. 25, 2020 as received in Application No. 201810332849.7.

Extended European Search Report dated Apr. 26, 2021 as received in Application No. 19784410.3.

JP Office Action dated Dec. 13, 2021 as received in Application No. 2020-556318.

US Non-Final Office Action dated Mar. 31, 2022 as received in U.S. Appl. No. 17/068,727.

\* cited by examiner

SIDELINK OPERATION METHOD AND TERMINAL

CROSS-REFERENCE TO RELATED APPLICATION

The present application is a continuation application of U.S. application Ser. No. 17/068,727 filed on Oct. 12, 2020, which is a continuation application of International Application No. PCT/CN2019/081896 filed on Apr. 9, 2019 and claims priority of Chinese Patent Application No. 201810332849.7 filed on Apr. 13, 2018, the contents of which are incorporated herein by reference in their entireties.

TECHNICAL FIELD

The present disclosure relates to the field of communications technology, and in particular to a sidelink operation method and a terminal.

BACKGROUND

Sidelink, which is used for direct transmission between terminals without a network equipment, is supported by Long Term Evolution (LTE) system in related art. However, the sidelink transmission in the LTE system of the related art is performed on basis of broadcasting, and the receiving terminal does not feedback any information to the transmitting terminal. For example: only one piece of data is transmitted, and the receiving terminal may not receive the piece of data for various reasons, resulting in lower transmission reliability of the system. If the transmitting terminal ensures the reliability of data transmission by broadcasting multiple pieces of the same data, the system resource utilization and frequency efficiency may be reduced. It can be seen that the transmission performance of sidelink in the related art is relatively poor.

SUMMARY

The embodiments of the present disclosure provide a sidelink operation method and a terminal.

In a first aspect, an embodiment of the present disclosure provides a sidelink operation method applied to a terminal, including:
  acquiring sidelink configuration information, wherein the sidelink configuration information includes at least one of feedback configuration information and measurement configuration information;
  performing at least one of a measurement operation and a feedback operation on sidelink according to the sidelink configuration information.

In a second aspect, an embodiment of the present disclosure further provides a terminal including:
  an acquisition module configured to acquire sidelink configuration information, wherein the sidelink configuration information includes at least one of feedback configuration information and measurement configuration information;
  a performing module configured to perform at least one of a measurement operation and a feedback operation on sidelink according to the sidelink configuration information.

In a third aspect, an embodiment of the present disclosure further provides a terminal including: a storage, a processor, and a computer program stored on the storage and capable of running on the processor, the computer program implementing, when executed by the processor, the steps of the sidelink operation method provided by an embodiment of the present disclosure.

In a fourth aspect, an embodiment of the present disclosure further provides a computer readable storage medium having a computer program stored thereon, the computer program implementing, when executed by a processor, the steps of the sidelink operation method provided by an embodiment of the present disclosure.

In the embodiments of the present disclosure, sidelink configuration information is acquired, wherein the sidelink configuration information includes at least one of feedback configuration information and measurement configuration information; at least one of a measurement operation and a feedback operation is performed on sidelink according to the sidelink configuration information. Thus, the transmission performance of sidelink can be improved.

DETAILED DESCRIPTION

Figure 1:
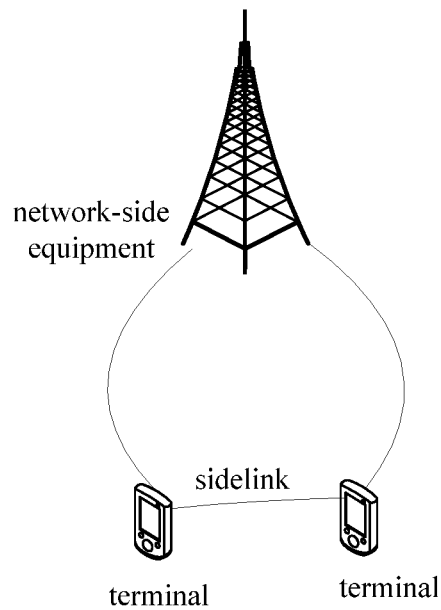
FIG. 1 is a structural diagram of a network system to which an embodiment of the present disclosure is applicable.

Referring to FIG. 1, it is a structural diagram of a network system to which an embodiment of the present disclosure is applicable. As shown in FIG. 1, it includes multiple terminals. The terminal may also be called a terminal equipment or a user terminal (UE). The terminal may be a terminal-side equipment, such as a mobile phone, a tablet personal computer, a laptop computer, a personal digital assistant (PDA), a mobile internet device (MID), a wearable device, or an in-vehicle device. It should be noted that the specific types of terminals are not limited in the embodiments of the present disclosure. In the embodiments of the present disclosure, multiple terminals may communicate through the sidelink, for example, data transmission or signaling transmission, etc. In addition, the communication between multiple terminals through the sidelink may be one-to-one communication, one-to-many communication, or many-to-one communication, which is not limited in the embodiments of the present disclosure. Of course, the above network system may also include a network-side equipment, and the network-side equipment may communicate with the terminals, for example: signaling transmission or data transmission, or the like. Of course, in some scenarios, some terminals may not be able to communicate with the network-side equipment, for example, some terminals are outside the network coverage. The network-side equipment may be a base station, such as a 4G base station, or a 5G base station, or a base station of a later version, or a base station in other communication systems, or called Node B, Evolved Node B, or other words in the field, as long as it can achieve the same technical effect, the base station is not limited to a specific technical term. It should be noted that in the embodiments of the present disclosure, only a 5G base station is taken as an example, but the specific type of network-side equipment is not limited.

Figure 2:
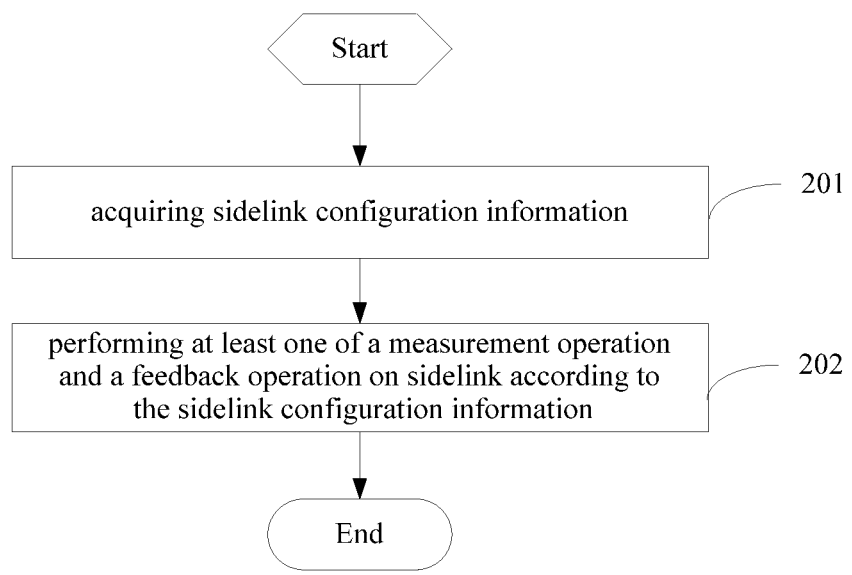
FIG. 2 is a flowchart of a sidelink operation method according to an embodiment of the present disclosure.

Referring to FIG. 2, it is a flowchart of a sidelink operation method according to an embodiment of the present disclosure. The method is applied to a terminal, and as shown in FIG. 2, includes the following steps:

Step 201, acquiring sidelink configuration information, wherein the sidelink configuration information includes at least one of feedback configuration information and measurement configuration information.

The aforementioned acquiring sidelink configuration information may be: acquiring the sidelink configuration information through pre-configuration, signaling transmitted from network side, or signaling transmitted by a peer terminal. For example, the sidelink configuration information may be predefined by a protocol, or pre-configured by a terminal, and the above signaling transmitted from network side may be broadcasting signaling, higher layer signaling, Media Access Control Control Element (MAC CE), or Downlink Control Information (DCI). That is to say, the network side may configure the above sidelink configuration information through broadcast, dedicated Radio Resource Control (RRC) higher layer signaling, MAC CE or DCI. The above signaling transmitted by the peer terminal may include: sidelink broadcasting channel signaling, sidelink physical layer control signaling, or sidelink higher layer signaling. Among them, the above broadcasting channel may be Physical Sidelink Broadcast Channel (PSBCH), Sidelink Master Information Block (SL-MIB), or Sidelink Broadcast Control Channel (SBCCH). The above sidelink physical control channel may be Sidelink Control Information (SCI), and the above sidelink higher layer signaling may be the MAC CE of sidelink, or the RRC signaling.

The above feedback configuration information may be information used to configure the feedback operation of the terminal on the sidelink, so that the terminal may feedback according to the feedback configuration information, so as to improve the feedback performance on the sidelink. The above measurement configuration information may be information used to perform configuration by the measurement operation of the terminal on the sidelink, so that the terminal can perform measurement according to the measurement configuration information, so as to improve the measurement performance on the sidelink.

Step 202, performing at least one of a measurement operation and a feedback operation on the sidelink according to the sidelink configuration information.

The above measurement operation may be transmitting a measurement reference signal, or measuring the measurement reference signal, and the above feedback operation may be performing feedback on the peer terminal, for example, feeding back a transmission result, or feeding back channel state information (CSI), etc.

In the embodiments of the present disclosure, the measurement reference signal may be a reference signal used for channel estimation or detection, or a synchronization reference signal. In addition, in the embodiments of the present disclosure, the measurement reference signal may also be referred to as a measurement signal.

The above performing at least one of the measurement operation and the feedback operation on sidelink according to the sidelink configuration information may be: performing the feedback operation according to the feedback configuration information, and/or, performing the measurement operation according to the measurement configuration information.

With the above step, the terminal can perform at least one of the measurement operation and the feedback operation on the sidelink, so that the transmission performance of sidelink can be improved in the embodiment of the present disclosure compared with the related art in which the receiving terminal does not feedback any information to the transmitting terminal.

In addition, since the measurement operation and the feedback operation can be performed on the sidelink, the physical layer point-to-point connection between the first terminal and the peer terminal can be realized, and the physical layer unicast transmission and the feedback of information such as retransmission response or CSI by the terminal can be supported on the sidelink; furthermore, beam pairing can be performed between terminals to improve the system resource utilization and spectrum efficiency, and achieve the effect of improving the transmission performance of sidelink. For example, the beam pairing between terminals may be performed according to the foregoing physical layer feedback information, and use the paired beams for data transmission, or one terminal may perform data retransmission according to feedback information fed back by another terminal.

It should be noted that the foregoing method provided in the embodiments of the present disclosure may be applied to systems such as LTE Sidelink or 5G NR Sidelink or 802.11p or Dedicated Short Range Communications (DSRC). Among them, 802.11p can also be called Wireless Access in the Vehicular Environment (WAVE) system. However, there is no limitation on this, as long as it can achieve basically the same functions, it is suitable for other communication systems, for example, 6G systems or other communication systems that use Sidelink can be applied.

As an optional implementation, the feedback configuration information includes at least one of:
  feedback content, feedback type, feedback period, and a
    mapping mode of feedback bit.
  The feedback content may include at least one of: a reception response of Physical Sidelink Shared Channel (PSSCH), and CSI feedback;
  the feedback type may include: periodic feedback, aperiodic feedback, or semi-persistent feedback;
  the mapping mode of feedback bit may include at least one of:
  a maximum number of Resource Elements (REs) allocated for feedback bit, beta-offset of feedback bit mapping, a maximum number of bits fed back simultaneously, a discarding partial feedback bit configuration, and a bundling feedback bit configuration.

The above beta-offset may be used to indicate the beta-offset configuration actually used by feedback bit and PSSCH resource mapping when the PSSCH is multiplexed to transmit the feedback bits, and the beta-offset configuration may indicate the number of REs allocated to the feedback bits. With the beta-offset indication, the interaction performance between terminals can be improved, thereby improving the transmission performance of sidelink.

The above discarding partial feedback bit configuration is used to indicate whether to discard a part of the feedback bits and how to discard the part of the feedback bits. For example, in a case that the number of bits that need to be fed back at the terminal exceeds the maximum number of bits, or the maximum number of REs allocated for feedback bits cannot transmit all the feedback bits, discarding can be performed according to the discarding partial feedback bit configuration. Since the discarding is performed according to the discarding partial feedback bit configuration, the feedback performance can be guaranteed. For example: discarding can be performed according to the priority level, or according to the type.

The above bundling feedback bit configuration is used to indicate whether to bundle feedback bits and how to bundle feedback bits. For example, in a case that the number of bits that need to be fed back at the terminal exceeds the maximum number of bits, or the maximum number of REs allocated for feedback bits cannot transmit all the feedback bits, multiple pieces of feedback information are bundled to a common feedback bit, so that fewer resources can be used to feedback more feedback information, so as to improve the feedback performance of sidelink. For example: the maximum number of bits is 2, and the terminal needs to feedback 4 pieces of feedback information in some scenarios, and the 4 pieces of feedback information can be bundled to 2 bits for feedback. For example, 1 means that both the two pieces of feedback information are received successfully, while 0 means that the two pieces of feedback information both are received unsuccessfully or partially received unsuccessfully.

In this implementation, it is possible to clarify the feedback behavior of the terminal through the above feedback configuration information, thereby avoiding erroneous feedback, and improving the feedback performance of sidelink.

As an optional implementation, the measurement configuration information includes at least one of:
a measurement reference signal configuration, a measurement reference signal transmission configuration, and a measurement reference signal measurement configuration;
wherein the measurement reference signal configuration is used to indicate at least one of a type, location, bandwidth, period, and sequence of a measurement reference signal;
the measurement reference signal transmission configuration is used to indicate validity or invalidity of transmission of the measurement reference signal;
the measurement reference signal measurement configuration is used to indicate start or stop of measurement of the measurement reference signal, and feedback information for indicating start or stop of transmission of the measurement reference signal.

The above sequence of the measurement reference signal may be the sequence generation of the measurement reference signal, or may be understood as generating the above sequence of the measurement reference signal.

The above validity of transmission of the measurement reference signal may be: allowing to transmit the measurement reference signal or instructing to transmit the measurement reference signal. The above invalidity of transmission of the measurement reference signal may be understood as: prohibiting the transmission of the measurement reference signal.

In this implementation, with the above measurement configuration information, the related information of the measurement reference signal can be determined, and the transmission behavior, measurement behavior, and feedback behavior of the measurement reference signal can be determined, so that erroneous measurement operations are avoided.

As an optional implementation, before the performing at least one of the measurement and the feedback on sidelink according to the sidelink configuration information, the method further includes:

enabling or disabling at least one of a measurement mechanism and a feedback mechanism;
the performing at least one of the measurement operation and the feedback operation on sidelink according to the sidelink configuration information includes:
in a case of enabling the measurement mechanism, performing the measurement operation according to the measurement configuration information;
in a case of enabling the feedback mechanism, performing the feedback operation according to the feedback configuration information.

The above measurement mechanism may be: allowing the terminal to perform the measurement operation, and the above feedback mechanism may be: allowing the terminal to perform the feedback operation.

In this implementation, it is possible to flexibly configure the measurement mechanism and the feedback mechanism, so that the effects that the power consumption of the terminal and the transmission resources can be saved is achieved. For example, the measurement mechanism and the feedback mechanism can be disabled in some scenarios to save the power consumption of the terminal and the transmission resources, because some scenarios may not require feedback and measurement.

It should be noted that the measurement mechanism and the feedback mechanism can also be called the measurement and feedback mechanism, that is, the two mechanisms can be enabled or disabled together. Of course, this is not limited, for example: in some scenarios, the feedback mechanism may be enabled while the measurement mechanism may be disabled.

Optionally, the enabling or disabling at least one of the measurement mechanism and the feedback mechanism includes:
enabling or disabling at least one of the measurement mechanism and the feedback mechanism according to a pre-configuration, signaling transmitted from network side, or signaling transmitted by a peer terminal.

The foregoing enabling or disabling at least one of the measurement mechanism and the feedback mechanism according to the signaling transmitted from network side may be as follows: the network side equipment enables or disables at least one of the measurement mechanism and the feedback mechanism through broadcasting or dedicated RRC higher layer signaling, MAC CE or DCI; the foregoing enabling or disabling at least one of the measurement mechanism and the feedback mechanism according to the signaling transmitted by the peer terminal may be as follows: the transmitting terminal requests the receiving terminal through signaling, to enable or disable at least one of the measurement mechanism and the feedback mechanism.

The signaling transmitted from network side may include:
broadcasting signaling, higher layer signaling, MAC CE, or DCI;
the signaling transmitted by the peer terminal may include:
sidelink broadcasting channel signaling, sidelink broadcasting control channel signaling, sidelink physical layer control signaling, or sidelink higher layer signaling.

In this implementation, it is possible to flexibly enable or disable at least one of the measurement mechanism and the feedback mechanism to improve the transmission performance of sidelink.

In addition, it should be noted that, to enable or disable the measurement mechanism and the feedback mechanism, the above sidelink configuration information may be configured through the same signaling, which can save transmission overhead. Of course, the configuration of the sidelink configuration information, and the enabling and disabling of the measurement mechanism and feedback mechanism can also be realized through different methods or different signaling, which is not limited.

In addition, if the terminal receives the signaling transmitted from network side, and the terminal can also have the pre-configuration content, the terminal can validate the configuration in the signaling transmitted from network side; that is, the configuration in the signaling transmitted from network side overwrites the content in the pre-configuration.

As an optional implementation, before the enabling or disabling at least one of the measurement mechanism and the feedback mechanism according to the pre-configuration, the signaling transmitted from network side, or the signaling transmitted by the peer terminal, the method further includes at least one of:

reporting capability information of the terminal to the network side through RRC signaling;

broadcasting the capability information of the terminal through the sidelink;

wherein the capability information is used to indicate at least one of:

whether to support measurement, whether to support feedback, type of supported measurement, content of supported measurement, type of supported feedback, and content of supported feedback.

The foregoing whether to support measurement may be: whether to support transmission of a measurement reference signal, or whether to support measurement of the measurement reference signal, the type of supported measurement may be the type of the supported measurement reference signal, and the content of supported measurement may be the content of the supported measurement reference signal.

The foregoing broadcasting the capability information of the terminal through the sidelink may be: informing surrounding terminals (for example: surrounding receiving terminals) of the capability information of the terminal through sidelink broadcast.

In this implementation, since the capability information of the terminal is transmitted to the network side or the surrounding terminals, the network side can perform corresponding configuration according to the capability information to improve the performance of the communication system and avoid incorrect configuration, and the surrounding terminals can perform corresponding transmissions on the sidelink according to the capability information of the terminal to improve the transmission performance of sidelink.

As an optional implementation, the performing the feedback operation on the sidelink includes:

transmitting feedback bits and feedback indication information on the sidelink through at least one of SCI, PSSCH scheduled by the SCI, and MAC CE.

It should be noted that the above feedback bits and feedback indication information can be transmitted in any of the SCI, the PSSCH scheduled by the SCI and the MAC CE; or, the feedback bits may be transmitted in some of the SCI, the PSSCH scheduled by the SCI and the MAC CE, while the feedback indication information is transmitted in others, which is not limited. Optionally, the above feedback indication information is transmitted in the above SCI. Of course, in addition to the above feedback indication information being transmitted, the SCI may also transmit or not transmit feedback bits.

In this implementation, it can be realized that the terminal carries or transmits feedback bits in the SCI, and the terminal also carries the feedback bits in the PSSCH scheduled by the SCI (that is, the PSSCH is multiplexed to transmit the feedback bits), and indicates in the scheduled SCI whether or not there are feedback bits in the PSSCH or SCI; and it can also be realized that the UE carries the feedback bits in the MAC layer signaling (for example: MAC CE). In this way, diversified feedback can be used to meet different communication needs and improve the feedback performance of sidelink.

Optionally, the feedback indication information includes at least one of:

feedback type or feedback content, reception object of feedback, and PSSCH transmission process number in response to the feedback;

wherein the feedback type or feedback content includes at least one of: a response of receiving PSSCH, and CSI feedback;

the reception object of feedback includes: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

The response of receiving PSSCH may be HARQ-ACK or other responses. The above CSI feedback may include at least one of: a Channel Quality Indicator (CQI), a Precoding Matrix Indicator (PMI), a CSI-RS resource indicator (CRI), a Rank Indication (RI), a Layer Indication (LI), and Layer 1 Reference Signal Received Power (L1-RSRP), wherein the above CSI-RS refers to the Channel State Information Reference Signal.

The above terminal may be a terminal to which the embodiment of the present disclosure is applied, because the above terminal may be used as the transmitting terminal or the receiving terminal in the process of the PSSCH transmission or signaling transmission. Of course, the above terminal may also be other terminals that perform feedback, which is not limited. The above temporary ID may be a Radio Network Temporary Identity (RNTI).

The feedback performance of sidelink can be improved through the above reception objects of feedback.

As an optional implementation, the performing the measurement operation on the sidelink includes at least one of:

transmitting a measurement reference signal to a peer terminal on the sidelink;

measuring a measurement reference signal that is transmitted on the sidelink by the peer terminal.

In this implementation, it can be achieved that the terminal transmits a measurement reference signal to the peer terminal, so that the peer terminal can perform measurement, and the measurement result can be fed back. Moreover, it can also achieved to measure the measurement reference signal that is transmitted on the sidelink by the peer terminal, and then feedback the measurement result to the peer terminal through the feedback operation, which can improve the measurement performance of sidelink, and the measurement result fed back can be used for transmission adaptation, e.g., beam pairing, thereby improving the system resource utilization and spectrum efficiency.

As an optional implementation, after the acquiring the sidelink configuration information, the method further includes:

according to a usage case of feedback mechanism of the peer terminal, transmitting PSSCH data in a corresponding transmission mode;

wherein, if the usage case is to enable the feedback mechanism, and in the transmission mode, if reception failure fed back by the peer terminal is received, the PSSCH data that fails to be received is retransmitted;

if the usage case is to disable the feedback mechanism, then in the transmission mode, blind retransmission is performed on the PSSCH data, wherein the blind retransmission refers to transmission of multiple pieces of same transmission blocks which are transmission blocks of a same piece of PSSCH data, or the blind retransmission refers to transmission multiple pieces of transmission blocks of different redundancy versions which are transmission blocks of a same piece of PSSCH data.

The above usage case of feedback mechanism of the peer terminal may be transmitted by the peer terminal, or configured by the network side, or pre-configured, or the like, which is not limited.

In this implementation, after determining the usage case of feedback mechanism of the peer terminal, transmission may be performed in a corresponding transmission mode to improve the success rate of data transmission. For example, if the peer terminal enables the feedback mechanism, and in the transmission mode, if reception failure fed back by the peer terminal is received, the PSSCH data that fails to be received is retransmitted; if reception success fed back by the peer terminal is received, each piece of PSSCH data only needs to be transmitted once, which can save transmission resources. If the usage case is to disable the feedback mechanism, then blind transmission can be performed, that is, multiple pieces of transmission blocks for one piece of PSSCH data are transmitted, wherein the multiple pieces of transmission blocks may be the same transmission blocks, or may be multiple pieces of transmission blocks of different redundancy versions.

The following uses multiple examples to illustrate the above sidelink operation method:

Example I

1. The operator has turned off the physical layer measurement and the feedback mechanism in the sidelink pre-configuration parameters.

2. UE-1 works outside the network coverage according to the pre-configuration information, and performs transmission based on the physical layer broadcasting mechanism on the sidelink. The synchronization signal can be broadcasted to the receiving-end UE to synchronize and receive data simultaneously according to the mechanism in the related art.

3. The UE-1 moves into the network coverage and receives the configuration information broadcasted by the network side device. The broadcasting configuration enables the physical layer measurement and the feedback mechanism, and provides the measurement configuration information and the feedback configuration information, and the UE-1 validates the broadcasting configuration information.

4. The UE-1 informs surrounding UEs of its capability to support measurement and feedback on the sidelink, informs it to enable the measurement and feedback mechanism, and transmits a measurement reference signal to request the receiving-end UE to transmit feedback. The request may include the measurement reference signal configuration and the feedback configuration information, etc.

5. The UE-1 synchronizes with a certain transmitting terminal UE-2 through a sidelink synchronization signal to obtain its measurement and feedback capabilities and configuration information. If the transmitting terminal UE-2 enables the measurement reference signal, then the signal is measured.

6. If the UE-1 receives the unicast PSSCH transmitted by the UE-2, it feeds back the PSSCH reception demodulation result through sidelink (for example, HARQ-ACK).

7. The UE-1 feeds back the sidelink measurement result to the UE-2 according to the measurement and feedback configuration information transmitted by the UE-2.

8. Similarly, the UE-2 also feeds back HARQ-ACK and the sidelink measurement result to the UE-1 through the sidelink.

Example II

1. The UE-1 and the UE-2 move into the network coverage, access the network, and report sidelink capabilities. The UE-1 supports transmitting the measurement reference signal and feeding back the capability, while the UE-2 only supports feeding back the capability. The network side enables and configures the feedback configuration of the UE-1 and UE-2 through RRC signaling, and enables and configures the sidelink measurement reference signal configuration of the UE-1.

2. The UE-1 transmits the measurement reference signal on the sidelink according to the network side configuration.

3. Once the UE-2 receives the unicast PSSCH transmitted by the UE-1, it feeds back HARQ-ACK through the sidelink.

4. Similarly, the UE-1 also feeds back HARQ-ACK to the UE-2 through the sidelink.

Example III

1. The UE-1 and the UE-2 move into the network coverage, access the network, and report sidelink capabilities. The UE-1 supports transmitting the measurement reference signal and feeding back the capability, while the UE-2 does not support feeding back the capability. The network side enables and configures the feedback configuration of the UE-1 through RRC signaling, and enables and configures the sidelink measurement reference signal configuration of the UE-1.

2. The UE-1 transmits the measurement reference signal on the sidelink according to the network side configuration.

3. The UE-2 informs, through sidelink broadcast, the surrounding receiving UEs that it does not enable or support sidelink feedback.

4. The UE-1 knows that the UE-2 does not enable sidelink feedback by receiving the broadcasting information of the UE-2. If the UE-1 needs to transmit the PSSCH to the UE-2, the UE-1 can transmit the PSSCH by broadcasting multiple pieces of the same number (that is, the blind retransmission).

5. If the UE-2 receives the PSSCH transmitted by the UE-1, it tries to demodulate or combine multiple pieces of received PSSCHs, but does not feedback the HARQ-ACK through the sidelink.

In the embodiment of the present disclosure, the sidelink configuration information is acquired, wherein the sidelink configuration information includes at least one of the feedback configuration information and the measurement configuration information; according to the sidelink configuration information, at least one of the measurement operation and the feedback operation is performed on the sidelink. Thus, the transmission performance of the sidelink can be improved.

Figure 3:
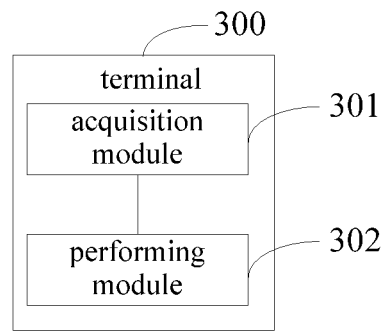
FIG. 3 is a structural diagram of a terminal according to an embodiment of the present disclosure.

Referring to FIG. 3, it is a structural diagram of a terminal according to an embodiment of the present disclosure. As shown in FIG. 3, the terminal 300 includes:
  an acquisition module 301 configured to acquire sidelink configuration information, wherein the sidelink configuration information includes at least one of feedback configuration information and measurement configuration information;
  a performing module 302 configured to perform at least one of a measurement operation and a feedback operation on sidelink according to the sidelink configuration information.

Optionally, the feedback configuration information includes at least one of:
  feedback content, feedback type, feedback period, and a mapping mode of feedback bit.

Optionally, the feedback content includes at least one of: a reception response of the PSSCH, and CSI feedback;
  the feedback type includes: periodic feedback, aperiodic feedback, or semi-persistent feedback;
  the mapping mode of feedback bit includes at least one of:
  a maximum number of resource elements (REs) allocated for feedback bit, beta-offset of feedback bit mapping, a maximum number of bits fed back simultaneously, a discarding partial feedback bit configuration, and a bundling feedback bit configuration.

Optionally, the measurement configuration information includes at least one of:
  a measurement reference signal configuration, a measurement reference signal transmission configuration, and a measurement reference signal measurement configuration;
  wherein the measurement reference signal configuration is used to indicate at least one of a type, location, bandwidth, period, and sequence of a measurement reference signal;
  the measurement reference signal transmission configuration is used to indicate validity or invalidity of transmission of the measurement reference signal;
  the measurement reference signal measurement configuration is used to indicate start or stop of measurement of the measurement reference signal, and feedback information for indicating start or stop of transmission of the measurement reference signal.

Figure 4:
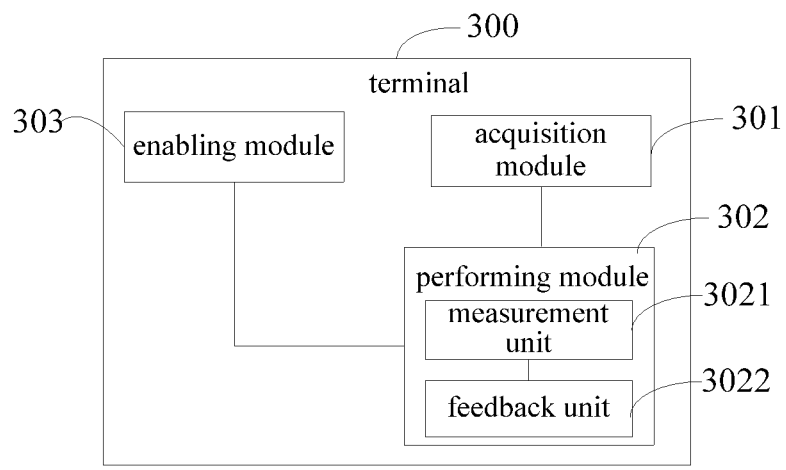
FIG. 4 is a structural diagram of another terminal according to an embodiment of the present disclosure.

Optionally, as shown in FIG. 4, the terminal 300 further includes:
  an enabling module 303 configured to enable or disable at least one of a measurement mechanism and a feedback mechanism;
  the performing module 302 includes:
  a measurement unit 3021 configured to, in a case of enabling the measurement mechanism, perform the measurement operation according to the measurement configuration information;
  a feedback unit 3022 configured to, in a case of enabling the feedback mechanism, perform the feedback operation according to the feedback configuration information.

Optionally, the enabling module 303 is configured to enable or disable at least one of the measurement mechanism and the feedback mechanism according to a pre-configuration, signaling transmitted from network side, or signaling transmitted by the peer terminal.

Optionally, the acquisition module 301 is configured to acquire the sidelink configuration information through a pre-configuration, signaling transmitted from network side, or signaling transmitted by the peer terminal.

Optionally, the signaling transmitted from network side includes:
  broadcasting signaling, higher layer signaling, MAC CE, or downlink control information (DCI);
  the signaling transmitted by the peer terminal includes:
  sidelink broadcasting channel signaling, sidelink broadcasting control channel signaling, sidelink physical layer control signaling, or sidelink higher layer signaling.

Figure 5:
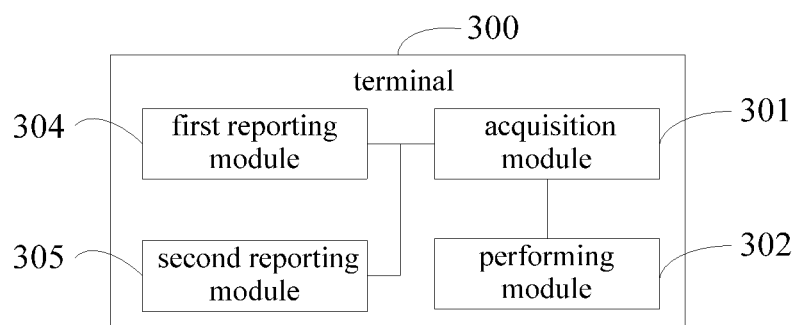
FIG. 5 is a structural diagram of another terminal according to an embodiment of the present disclosure.

Optionally, as shown in FIG. 5, the terminal 300 further includes at least one of:
  a first reporting module 304 configured to report capability information of the terminal to the network side through the RRC signaling;
  a second reporting module 305 configured to broadcast the capability information of the terminal through the sidelink;
  wherein the capability information is used to indicate at least one of:
  whether to support measurement, whether to support feedback, type of supported measurement, content of supported measurement, type of supported feedback, and content of supported feedback.

Optionally, the performing the feedback operation on the sidelink includes:
  transmitting feedback bit and feedback indication information on the sidelink through at least one of SCI, PSSCH scheduled by the SCI, and MAC CE.

Optionally, the feedback indication information includes at least one of:
  feedback type or feedback content, reception object of feedback, PSSCH transmission process number in response to the feedback;
  wherein the feedback type or feedback content includes at least one of: a response of receiving PSSCH, and CSI feedback;
  the reception object of feedback includes: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

Optionally, the performing the measurement operation on the sidelink comprises at least one of:
  transmitting a measurement reference signal to a peer terminal on the sidelink;
  measuring a measurement reference signal that is transmitted on the sidelink by the peer terminal.

Figure 6:
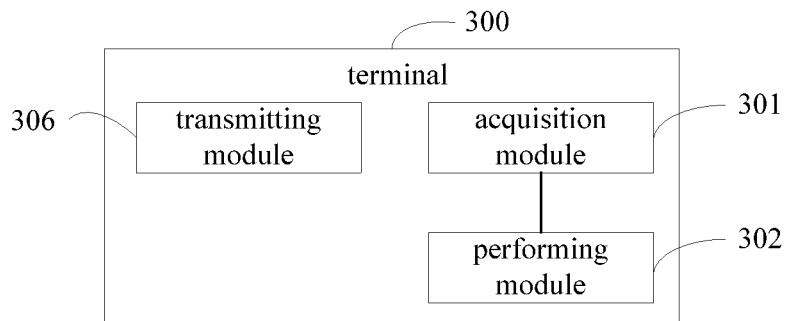
FIG. 6 is a structural diagram of another terminal according to an embodiment of the present disclosure.

Optionally, as shown in FIG. 6, the terminal further includes:
  a transmitting module 306 configured to, according to a usage case of feedback mechanism of a peer terminal, transmit PSSCH data in a corresponding transmission mode;
  wherein, if the usage case is to enable the feedback mechanism, and in the transmission mode, if reception failure fed back by the peer terminal is received, the PSSCH data that fails to be received is retransmitted;
  if the usage case is to disable the feedback mechanism, then in the transmission mode, blind retransmission is performed on the PSSCH data, wherein the blind retransmission refers to transmission of multiple pieces of same transmission blocks which are transmission blocks of a same piece of PSSCH data, or the blind retransmission refers to transmission of multiple pieces of transmission blocks of different redundancy versions which are transmission blocks of a same piece of PSSCH data.

The terminal provided in the embodiment of the present disclosure can implement the processes implemented by the terminal in the method embodiment of FIG. 2. To avoid repetition, details are not described again here, and the transmission performance of sidelink can be improved.

Figure 7:
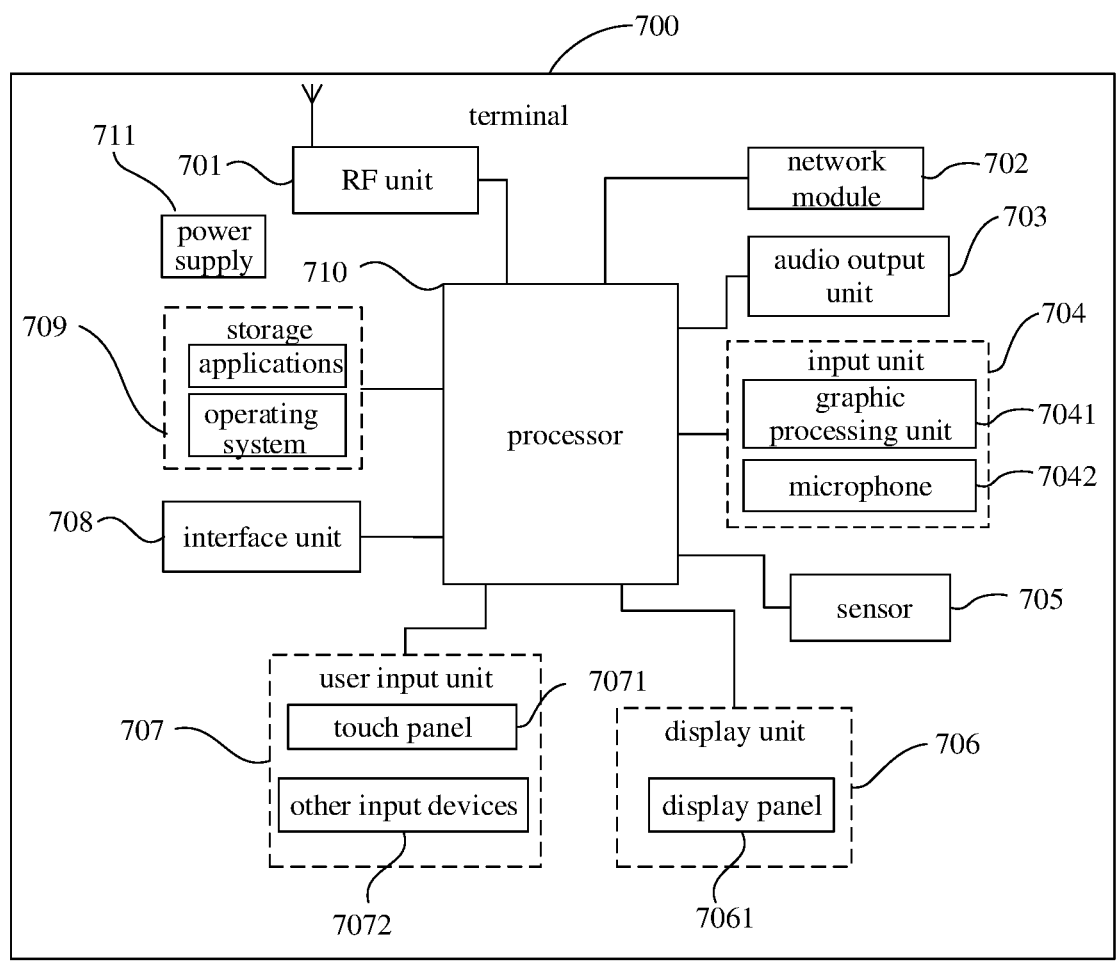
FIG. 7 is a structural diagram of another terminal according to an embodiment of the present disclosure.

FIG. 7 is a schematic diagram of the hardware structure of a terminal for implementing various embodiments of the present disclosure.

The terminal 700 includes, but is not limited to: a radio frequency unit 701, a network module 702, an audio output unit 703, an input unit 704, a sensor 705, a display unit 706, a user input unit 707, an interface unit 708, a storage 709, a processor 710, a power supply 711 and other components. Those skilled in the art may understand that the terminal structure shown in FIG. 7 does not constitute a limitation on the terminal, and the terminal may include more or fewer components than those illustrated, or combine some components, or have different component arrangement. In the embodiments of the present disclosure, the terminal includes but is not limited to a mobile phone, a tablet, a notebook, a palmtop computer, a in-vehicle terminal, a wearable device, a pedometer, and the like.

Among them, in an embodiment, in a case that the above terminal is a first terminal defined in the embodiment of the present disclosure, the processor 710 is configured to acquire sidelink configuration information, wherein the sidelink configuration information includes at least one of feedback configuration information and measurement configuration information;

the radio frequency unit 701 is configured to perform at least one of a measurement operation and a feedback operation on sidelink according to the sidelink configuration information.

Optionally, the feedback configuration information includes at least one of:

feedback content, feedback type, feedback period, and a mapping mode of feedback bit.

Optionally, the feedback content includes at least one of: a reception response of Physical Sidelink Shared Channel (PSSCH), and channel state information (CSI) feedback;

the feedback type includes: periodic feedback, aperiodic feedback, or semi-persistent feedback;

the mapping mode of feedback bit includes at least one of:

a maximum number of resource elements (REs) allocated for feedback bit, beta-offset of feedback bit mapping, a maximum number of bits fed back simultaneously, a discarding partial feedback bit configuration, and a bundling feedback bit configuration.

Optionally, the measurement configuration information includes at least one of:

a measurement reference signal configuration, a measurement reference signal transmission configuration, and a measurement reference signal measurement configuration;

wherein the measurement reference signal configuration is used to indicate at least one of a type, location, bandwidth, period, and sequence of a measurement reference signal;

the measurement reference signal transmission configuration is used to indicate validity or invalidity of transmission of the measurement reference signal;

the measurement reference signal measurement configuration is used to indicate start or stop of measurement of the measurement reference signal, and feedback information for indicating start or stop of transmission of the measurement reference signal.

Optionally, before the performing at least one of the measurement operation and the feedback operation on sidelink according to the sidelink configuration information, the processor 710 is further configured to:

enable or disable at least one of a measurement mechanism and a feedback mechanism;

the performing, by the radio frequency unit 701, at least one of the measurement operation and the feedback operation on sidelink according to the sidelink configuration information includes:

in a case of enabling the measurement mechanism, performing the measurement operation according to the measurement configuration information;

in a case of enabling the feedback mechanism, performing the feedback operation according to the feedback configuration information.

Optionally, the enabling or disabling, by the processor 710, at least one of the measurement mechanism and the feedback mechanism includes:

enabling or disabling at least one of the measurement mechanism and the feedback mechanism according to a pre-configuration, signaling transmitted from network side, or signaling transmitted by the peer terminal.

Optionally, the acquiring, by the processor 710, the sidelink configuration information includes:

acquiring the sidelink configuration information through a pre-configuration, signaling transmitted from network side, or signaling transmitted by the peer terminal.

Optionally, the signaling transmitted from network side includes:

broadcasting signaling, higher layer signaling, Media Access Control Control Element (MAC CE), or downlink control information (DCI);

the signaling transmitted by the peer terminal includes:

sidelink broadcasting channel signaling, sidelink broadcasting control channel signaling, sidelink physical layer control signaling, or sidelink higher layer signaling.

Optionally, before the enabling or disabling at least one of the measurement mechanism and the feedback mechanism according to the pre-configuration, the signaling transmitted from network side, or the signaling transmitted by the peer terminal, the radio frequency unit 701 is further configured to perform at least one of:

reporting capability information of the terminal to the network side through RRC signaling;

broadcasting the capability information of the terminal through the sidelink;

wherein the capability information is used to indicate at least one of:

whether to support measurement, whether to support feedback, type of supported measurement, content of supported measurement, type of supported feedback, and content of supported feedback.

Optionally, the performing the feedback operation on the sidelink includes:

transmitting feedback bit and feedback indication information on the sidelink through at least one of Sidelink Control Information (SCI), PSSCH scheduled by the SCI, and MAC CE.

Optionally, the feedback indication information includes at least one of:

feedback type or feedback content, reception object of feedback, and PSSCH transmission process number in response to the feedback;

wherein the feedback type or feedback content includes at least one of: a response of receiving PSSCH, and CSI feedback;

the reception object of feedback includes: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

Optionally, the performing the measurement operation on the sidelink includes at least one of:

transmitting a measurement reference signal to a peer terminal on the sidelink;

measuring a measurement reference signal that is transmitted on the sidelink by the peer terminal.

Optionally, after the acquiring the sidelink configuration information, the radio frequency unit 701 is further configured to:

according to a usage case of feedback mechanism of a peer terminal, transmit PSSCH data in a corresponding transmission mode;

wherein, if the usage case is to enable the feedback mechanism, and in the transmission mode, if reception failure fed back by the peer terminal is received, the PSSCH data that fails to be received is retransmitted;

if the usage case is to disable the feedback mechanism, then in the transmission mode, blind retransmission is performed on the PSSCH data, wherein the blind retransmission refers to transmission of multiple pieces of same transmission blocks which are transmission blocks of a same piece of PSSCH data, or the blind retransmission refers to transmission multiple pieces of transmission blocks of different redundancy versions which are transmission blocks of a same piece of PSSCH data.

The above terminals can improve the transmission performance of the sidelink.

It should be noted that, in the embodiment of the present disclosure, the radio frequency unit 701 may be used to receive and send signals during transmitting and receiving information or during a call, specifically, after receiving the downlink data from the base station, give it to the processor 710 to process the data; also, the uplink data is sent to the base station. Generally, the radio frequency unit 701 includes, but is not limited to, an antenna, at least one amplifier, a transceiver, a coupler, a low noise amplifier, a duplexer, and the like. In addition, the radio frequency unit 701 can also communicate with the network and other devices through a wireless communication system.

The terminal provides users with wireless access to the broadband Internet through the network module 702, such as helping users to send and receive e-mail, browse web pages, access streaming media, and the like.

The audio output unit 703 may convert the audio data received by the radio frequency unit 701 or the network module 702 or stored in the storage 709 into an audio signal and output as sound. Moreover, the audio output unit 703 may also provide audio output related to specific functions performed by the terminal 700 (e.g., call signal reception sound, message reception sound, etc.). The audio output unit 703 includes a speaker, a buzzer, a receiver, and the like.

The input unit 704 is used to receive audio or video signals. The input unit 704 may include a Graphics processing Unit (GPU) 7041 and a microphone 7042. The graphics processing unit 7041 processes image data of still pictures or video obtained by an image capturing device (such as a camera) in the video capturing mode or the image capturing mode. The processed image frame may be displayed on the display unit 706. The image frame processed by the graphics processing unit 7041 may be stored in the storage 709 (or other storage medium) or sent via the radio frequency unit 701 or the network module 702. The microphone 7042 can receive sound, and can process such sound into audio data. The processed audio data can be converted into a format that can be sent to the mobile communication base station via the radio frequency unit 701 in the telephone call mode, and can be output.

The terminal 700 also includes at least one sensor 705, such as a light sensor, a motion sensor, and other sensors. Specifically, the light sensor includes an ambient light sensor and a proximity sensor, wherein the ambient light sensor can adjust the brightness of the display panel 7061 according to the brightness of the ambient light, and the proximity sensor can close the display panel 7061 and/or the backlight when the terminal 700 moves to the ear. As a type of motion sensor, the accelerometer sensor can detect the magnitudes of accelerations in various directions (generally three axes), and can detect the magnitude and direction of gravity when not moving, and can be used to recognize the posture of the terminal (such as horizontal and vertical screen switching, related games, magnetometer attitude calibration), to perform vibration recognition related functions (such as pedometer, tapping), etc.; the sensor 705 may also include a fingerprint sensor, a pressure sensor, an iris sensor, a molecular sensor, a gyroscope, a barometer, a hygrometer, a thermometer, an infrared sensor, etc., which will not be repeated here.

The display unit 706 is used to display information input by the user or information provided to the user. The display unit 706 may include a display panel 7061, and the display panel 7061 may be configured in the form of a Liquid Crystal Display (LCD), an Organic Light-Emitting Diode (OLED), or the like.

The user input unit 707 may be used to receive input numeric or character information, and generate key signal input related to user settings and function control of the terminal. Specifically, the user input unit 707 includes a touch panel 7071 and other input devices 7072. The touch panel 7071, also known as a touch screen, can collect user's touch operation on or near it (for example, the user's operation on or near the touch panel 7071 using any suitable object or accessory, such as a finger or a stylus). The touch panel 7071 may include two parts of a touch detection device and a touch controller. Among them, the touch detection device detects the user's touch orientation, and detects the signal generated by the touch operation, and transmits the signal to the touch controller; the touch controller receives touch information from the touch detection device and converts it into contact coordinates, then sends the same to the processor 710, and receives and executes the command sent by the processor 710. In addition, the touch panel 7071 can be implemented in various types such as resistive, capacitive, infrared, and surface acoustic wave types. In addition to the touch panel 7071, the user input unit 707 may also include other input devices 7072. Specifically, other input devices 7072 may include, but are not limited to, a physical keyboard, function keys (such as volume control buttons, switch buttons, etc.), a trackball, a mouse, and a joystick, which will not be repeated here.

Further, the touch panel 7071 may be overlaid on the display panel 7061. When the touch panel 7071 detects a touch operation on or near it, it transmits the touch operation to the processor 710 to determine the type of touch event, and then the processor 710 provides a corresponding visual output on the display panel 7061 according to the type of touch event. Although in FIG. 7, the touch panel 7071 and the display panel 7061 are implemented as two independent components to realize the input and output functions of the terminal, in some embodiments, the touch panel 7071 and the display panel 7061 may be integrated to implement the input and output functions of the terminal, which is not limited here.

The interface unit 708 is an interface for connecting an external device to the terminal 700. For example, the external device may include a wired or wireless headset port, an external power (or battery charger) port, a wired or wireless data port, a memory card port, a port for connecting a device having an identification module, an audio input/output (I/O) port, a video I/O port, a headphone port, etc. The interface unit 708 may be used to receive input from external devices (e.g., data information, power, etc.) and transmit the received input to one or more elements within the terminal 700 or may be used to transfer data between the terminal 700 and the external devices.

The storage 709 may be used to store software programs and various data. The storage 709 may mainly include a program storage area and a data storage area, wherein the program storage area may store an operating system, applications required by at least one function (such as a sound playback function, an image playback function, etc.); the data storage area may store data created according to the use of a mobile phone (such as audio data, phone books, etc.), etc. In addition, the storage 709 may include a high-speed random access memory, and may also include a non-volatile storage, such as at least one magnetic disk storage device, a flash memory device, or other volatile solid-state storage devices.

The processor 710 is the control center of the terminal, connects various parts of the entire terminal by using various interfaces and lines, performs various functions and processing data of the terminal by running or executing software programs and/or modules stored in the storage 709 and calling data stored in the storage 709, so as to monitor the terminal as a whole. The processor 710 may include one or more processing units; preferably, the processor 710 may integrate an application processor and a modem processor, where the application processor mainly processes an operating system, a user interface, and applications, etc. The modem processor mainly processes wireless communication. It can be understood that the foregoing modem processor may not be integrated into the processor 710.

The terminal 700 may further include a power supply 711 (such as a battery) that supplies power to various components. Preferably, the power supply 711 may be logically connected to the processor 710 through a power management system, so as to implement charging, discharging, and power consumption management through the power management system.

In addition, the terminal 700 includes some unillustrated functional modules, which will not be repeated here.

Optionally, an embodiment of the present disclosure further provides a terminal which includes a processor 710, a storage 709, and a computer program stored on the storage 709 and capable of running on the processor 710. When executed by the processor 710, the computer program implements the processes of the sidelink operation method embodiment, and can achieve the same technical effects. To avoid repetition, details will not be described again here.

An embodiment of the present disclosure further provides a computer readable storage medium having a computer program stored thereon. When executed by a processor, the computer program implements the processes of the sidelink operation method embodiment, and can achieve the same technical effects. To avoid repetition, details will not be described again here. The computer readable storage medium may be a Read-Only Memory (ROM), a Random Access Memory (RAM), a magnetic disk, or an optical disk, etc.

It should be noted that, the terms herein "comprising", "including" or any other variant thereof are intended to cover non-exclusive inclusion, so that a process, method, article, or terminal equipment that includes a series of elements includes not only those elements, but also those that are not explicitly listed, or further includes elements inherent to such process, method, article or terminal equipment. Without more restrictions, the element defined by the sentence "comprising a . . . " does not exclude that there are other identical elements in the process, method, article, or terminal equipment that includes the element.

With the description of the above embodiments, those skilled in the art can clearly understand that the methods in the above embodiments can be implemented by means of software plus a necessary general hardware platform, and of course, can also be implemented by hardware, but in many cases the former is a preferred implementation. Based on such an understanding, the essential technical solutions of the present disclosure, or part of the technical solutions that contributes to the related art, can be embodied in the form of a software product; the computer software product is stored in a storage medium (such as a ROM/RAM, a magnetic disk, or an optical disk), including several instructions used to cause a terminal (which may be a mobile phone, a computer, a server, an air conditioner, or a network device, etc.) to perform the methods described in various embodiments of the present disclosure.

The embodiments of the present disclosure have been described above with reference to the drawings, but the present disclosure is not limited to the above specific embodiments. The above specific embodiments are merely schematic, not restrictive. Under the inspiration of the present disclosure, many forms can be made by those skilled in the art without departing from the purpose of the present disclosure and the scope protected by the claims, all of which fall within the protective scope of the present disclosure.

What is claimed is:

1. A sidelink operation method applied to a terminal, comprising:
    acquiring sidelink configuration information, wherein the sidelink configuration information comprises at least one of feedback configuration information or measurement configuration information;
    performing at least one of a measurement operation or a feedback operation on sidelink according to the sidelink configuration information;
    wherein the performing the feedback operation on sidelink comprises:

transmitting feedback bit and feedback indication information on the sidelink through at least one of Sidelink Control Information (SCI), Physical Sidelink Shared Channel (PSSCH) scheduled by the SCI, or Media Access Control Control Element (MAC CE);

wherein the feedback indication information comprises at least one of feedback type or feedback content, reception object of feedback, or PSSCH transmission process number in response to the feedback;

wherein the feedback type or feedback content comprises at least one of: a response of receiving PSSCH, or channel state information (CSI) feedback;

the reception object of feedback comprises: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

2. The method according to claim 1, wherein the measurement configuration information comprises at least one of a measurement reference signal configuration, a measurement reference signal transmission configuration, or a measurement reference signal measurement configuration;

wherein the measurement reference signal configuration is used to indicate at least one of a type, location, bandwidth, period, or sequence of a measurement reference signal;

the measurement reference signal transmission configuration is used to indicate validity or invalidity of transmission of the measurement reference signal;

the measurement reference signal measurement configuration is used to indicate start or stop of measurement of the measurement reference signal, and feedback information for indicating start or stop of transmission of the measurement reference signal.

3. The method according to claim 1, wherein prior to the performing at least one of the measurement operation or the feedback operation on sidelink according to the sidelink configuration information, the method further comprises:

enabling or disabling at least one of a measurement mechanism or a feedback mechanism;

the performing at least one of the measurement operation or the feedback operation on sidelink according to the sidelink configuration information, comprises:

in a case of enabling the measurement mechanism, performing the measurement operation according to the measurement configuration information;

in a case of enabling the feedback mechanism, performing the feedback operation according to the feedback configuration information.

4. The method according to claim 3, wherein the enabling or disabling at least one of the measurement mechanism or the feedback mechanism comprises:

enabling or disabling at least one of the measurement mechanism or the feedback mechanism according to a pre-configuration, signaling transmitted from network side, or signaling transmitted by a peer terminal.

5. The method according to claim 1, wherein the acquiring the sidelink configuration information comprises:

acquiring the sidelink configuration information through a pre-configuration, signaling transmitted from network side, or signaling transmitted by a peer terminal.

6. The method according to claim 4, wherein the signaling transmitted from network side comprises:

broadcasting signaling, higher layer signaling, Media Access Control Control Element (MAC CE), or downlink control information (DCI);

the signaling transmitted by the peer terminal comprises:

sidelink broadcasting channel signaling, sidelink broadcasting control channel signaling, sidelink physical layer control signaling, or sidelink higher layer signaling.

7. The method according to claim 4, wherein prior to the enabling or disabling at least one of the measurement mechanism or the feedback mechanism according to the pre-configuration, the signaling transmitted from network side, or the signaling transmitted by the peer terminal, the method further comprises at least one of:

reporting capability information of the terminal to the network side through radio resource control (RRC) signaling;

broadcasting the capability information of the terminal through the sidelink;

wherein the capability information is used to indicate at least one of:

whether to support measurement, whether to support feedback, type of supported measurement, content of supported measurement, type of supported feedback, or content of supported feedback.

8. The method according to claim 1, wherein the feedback configuration information comprises at least one of:

feedback content, feedback type, feedback period, or a mapping mode of feedback bit.

9. The method according to claim 8, wherein the feedback content comprises at least one of: a reception response of Physical Sidelink Shared Channel (PSSCH), or channel state information (CSI) feedback;

the feedback type comprises: periodic feedback, aperiodic feedback, or semi-persistent feedback;

the mapping mode of feedback bit comprises at least one of:

a maximum number of resource elements (REs) allocated for feedback bit, beta-offset of feedback bit mapping, a maximum number of bits fed back simultaneously, a discarding partial feedback bit configuration, or a binding feedback bit configuration.

10. The method according to claim 1, wherein the performing the measurement operation on the sidelink comprises at least one of:

transmitting a measurement reference signal to a peer terminal on the sidelink;

measuring a measurement reference signal that is transmitted on the sidelink by the peer terminal.

11. The method according to claim 1, wherein after the acquiring the sidelink configuration information, the method further comprises:

according to a usage case of feedback mechanism of a peer terminal, transmitting Physical Sidelink Shared Channel (PSSCH) data in a corresponding transmission mode;

wherein, if the usage case is to enable the feedback mechanism, and in the transmission mode, if reception failure fed back by the peer terminal is received, the PSSCH data that fails to be received is retransmitted;

if the usage case is to disable the feedback mechanism, then in the transmission mode, blind retransmission is performed on the PSSCH data, wherein the blind retransmission refers to transmission of multiple pieces of same transmission blocks which are transmission blocks of a same piece of PSSCH data, or the blind retransmission refers to transmission multiple pieces of transmission blocks of different redundancy versions which are transmission blocks of a same piece of PSSCH data.

12. A terminal comprising: a storage, a processor, and a computer program stored on the storage and capable of running on the processor, the computer program implementing, when executed by the processor, the steps of a sidelink operation method, the method comprising:

acquiring sidelink configuration information, wherein the sidelink configuration information comprises at least one of feedback configuration information or measurement configuration information;

performing at least one of a measurement operation or a feedback operation on sidelink according to the sidelink configuration information;

wherein the performing the feedback operation on the sidelink comprises:

transmitting feedback bit and feedback indication information on the sidelink through at least one of Sidelink Control Information (SCI), Physical Sidelink Shared Channel (PSSCH) scheduled by the SCI, or Media Access Control Control Element (MAC CE);

wherein the feedback indication information comprises at least one of:

feedback type or feedback content, reception object of feedback, or PSSCH transmission process number in response to the feedback;

wherein the feedback type or feedback content comprises at least one of: a response of receiving PSSCH, or channel state information (CSI) feedback;

the reception object of feedback comprises: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

13. The terminal according to claim 12, wherein the measurement configuration information comprises at least one of:

a measurement reference signal configuration, a measurement reference signal transmission configuration, or a measurement reference signal measurement configuration;

wherein the measurement reference signal configuration is used to indicate at least one of a type, location, bandwidth, period, or sequence of a measurement reference signal;

the measurement reference signal transmission configuration is used to indicate validity or invalidity of transmission of the measurement reference signal;

the measurement reference signal measurement configuration is used to indicate start or stop of measurement of the measurement reference signal, and feedback information for indicating start or stop of transmission of the measurement reference signal.

14. The terminal according to claim 12, wherein prior to the performing at least one of the measurement operation or the feedback operation on sidelink according to the sidelink configuration information, the method further comprises:

enabling or disabling at least one of a measurement mechanism or a feedback mechanism;

the performing at least one of the measurement operation or the feedback operation on sidelink according to the sidelink configuration information, comprises:

in a case of enabling the measurement mechanism, performing the measurement operation according to the measurement configuration information;

in a case of enabling the feedback mechanism, performing the feedback operation according to the feedback configuration information.

15. The terminal according to claim 14, wherein the enabling or disabling at least one of the measurement mechanism or the feedback mechanism comprises:

enabling or disabling at least one of the measurement mechanism or the feedback mechanism according to a pre-configuration, signaling transmitted from network side, or signaling transmitted by a peer terminal.

16. The terminal according to claim 15, wherein prior to the enabling or disabling at least one of the measurement mechanism or the feedback mechanism according to the pre-configuration, the signaling transmitted from network side, or the signaling transmitted by the peer terminal, the method further comprises at least one of:

reporting capability information of the terminal to the network side through radio resource control (RRC) signaling;

broadcasting the capability information of the terminal through the sidelink;

wherein the capability information is used to indicate at least one of:

whether to support measurement, whether to support feedback, type of supported measurement, content of supported measurement, type of supported feedback, or content of supported feedback.

17. The terminal according to claim 12, wherein the feedback configuration information comprises at least one of:

feedback content, feedback type, feedback period, or a mapping mode of feedback bit.

18. The terminal according to claim 17, wherein the feedback content comprises at least one of: a reception response of Physical Sidelink Shared Channel (PSSCH), or channel state information (CSI) feedback;

the feedback type comprises: periodic feedback, aperiodic feedback, or semi-persistent feedback;

the mapping mode of feedback bit comprises at least one of:

a maximum number of resource elements (REs) allocated for feedback bit, beta-offset of feedback bit mapping, a maximum number of bits fed back simultaneously, a discarding partial feedback bit configuration, or a binding feedback bit configuration.

19. The terminal according to claim 12, wherein the performing the measurement operation on the sidelink comprises at least one of:

transmitting a measurement reference signal to a peer terminal on the sidelink;

measuring a measurement reference signal that is transmitted on the sidelink by the peer terminal.

20. A non-transitory computer readable storage medium having a computer program stored thereon, the computer program implementing, when executed by a processor, the steps of a sidelink operation method, the method comprising:

acquiring sidelink configuration information, wherein the sidelink configuration information comprises at least one of feedback configuration information or measurement configuration information;

performing at least one of a measurement operation or a feedback operation on sidelink according to the sidelink configuration information;

wherein the performing the feedback operation on sidelink comprises:

transmitting feedback bit and feedback indication information on the sidelink through at least one of Sidelink Control Information (SCI), Physical Sidelink Shared Channel (PSSCH) scheduled by the SCI, or Media Access Control Control Element (MAC CE);

wherein the feedback indication information comprises at least one of:

feedback type or feedback content, reception object of feedback, or PSSCH transmission process number in response to the feedback;

wherein the feedback type or feedback content comprises at least one of: a response of receiving PSSCH, or channel state information (CSI) feedback;

the reception object of feedback comprises: an ID of a receiving terminal, a group ID of the receiving terminal, a fixed ID allocated to the receiving terminal by network, a temporary ID allocated to the receiving terminal by network, or a truncated ID of the receiving terminal, the receiving terminal is a terminal performing feedback.

* * * * *